United States Patent [19]
Zeng et al.

[11] Patent Number: 5,559,335
[45] Date of Patent: Sep. 24, 1996

[54] ROTATING AND WARPING PROJECTOR/BACKPROJECTOR FOR CONVERGING-BEAM GEOMETRIES

[75] Inventors: Gengsheng L. Zeng; Grant T. Gullberg, both of Salt Lake City, Utah

[73] Assignee: The University of Utah, Salt Lake City, Utah

[21] Appl. No.: 365,087

[22] Filed: Dec. 28, 1994

[51] Int. Cl.⁶ ............................................. G01T 1/166
[52] U.S. Cl. .................................. 250/363.04; 378/901
[58] Field of Search ...................... 378/901; 250/363.04, 250/370.09

[56] References Cited

U.S. PATENT DOCUMENTS

| | | | |
|---|---|---|---|
| 5,187,659 | 2/1993 | Eberhard, et al. | 364/413.15 |
| 5,438,602 | 8/1995 | Crawford et al. | 378/4 |
| 5,457,321 | 10/1995 | Ichihara et al. | 250/363.04 |

OTHER PUBLICATIONS

"Three–Dimensional Iterative Reconstruction Algorithms with Attenuation and Geometric Point Response Correction", Zeng, et al. IEEE Trans. Nucl. Sci. vol. 38, pp. 693–702, (1991).

"Frequency Domain Implementation of the Three–Dimensional Geometric Point Response Correction in SPECT Imaging", Zeng, et al., IEEE Trans. Nucl. Sci vol. 39, No. 5, pp. 1444–1453, (1992).

"3–D Maximum A Posteriori Estimation for Single Photon emission Computed Tomography on Massively–Parallel Computers", Miller, et al., IEEE Trans. Med. Imaging vol. 12, No. 3, pp. 560–565, (1993).

*Primary Examiner*—David P. Porta
*Assistant Examiner*—David Vernon Bruce
*Attorney, Agent, or Firm*—Fay, Sharpe, Beall, Fagan, Minnich & McKee

[57] ABSTRACT

A subject (12) in an examination region is injected with a radioisotope that emits radiation. A detector head (18) receives emission radiation projections (28a) from the radioisotope and transmission radiation projections (28b) from a transmission radiation source (22) disposed opposite the subject from the detector head. A volume memory (50) stores an estimated volume image. For each actually collected image emission data projection set, a projector (52) reprojects a set of projection of the volume image from the image memory (50) along each of the same projection directions as the emission data projections. Each projection is rotated (80) and warped (82) such that rays which converge with the same angle as the convergence of the collimator on the detector head become parallel. The layers are each convolved with a point response function (84) weighted in accordance with a depth of the corresponding layer in the volume image and corresponding points are summed (92) to create a reprojected projection. A ratio of each collected projection and the reprojected projection is calculated (54) and backprojected (56) into a volume of correction factors (58). The backprojectioned correction factors for the set of ratios are summed. A memory updating algorithm (76) multiplies the estimated volume image in the image memory (50) by the sum of the correction factors (58). This process is repeated iteratively over a plurality of projection directions, each iteration further refining the volume image in the volume image memory (50).

16 Claims, 4 Drawing Sheets

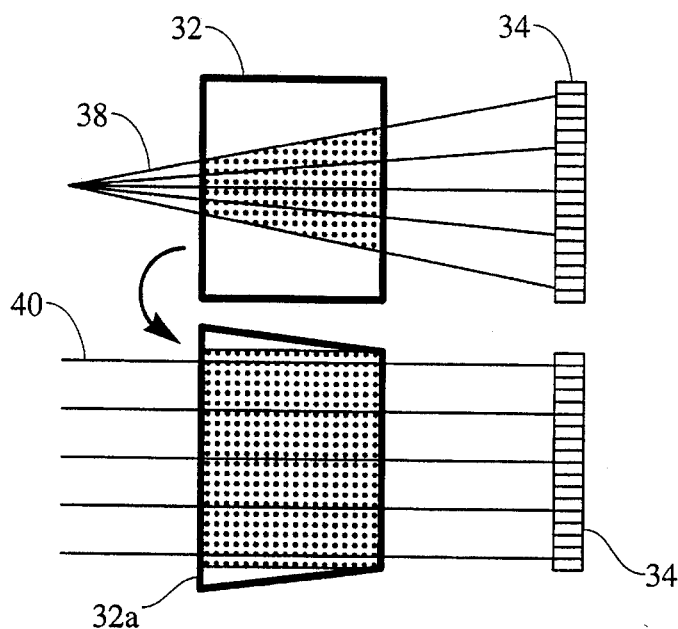
Fig.3A
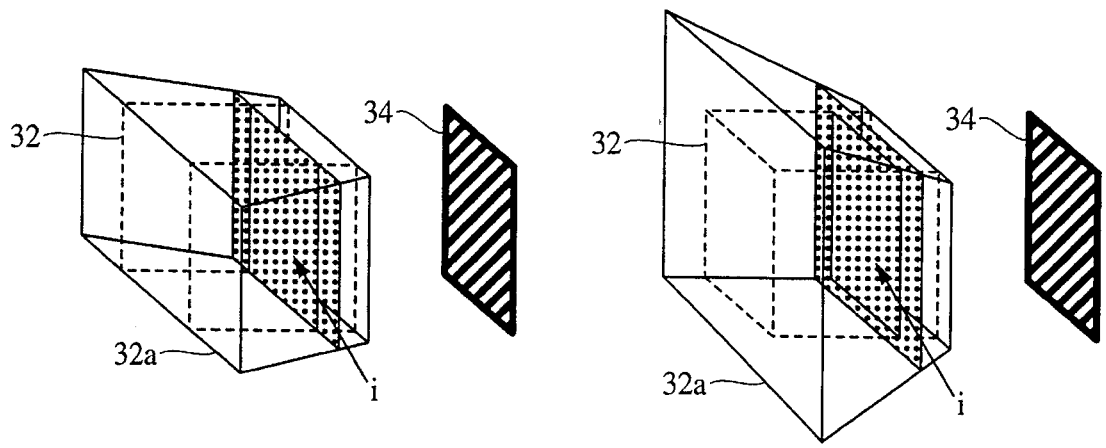
Fig.3B                    Fig.3C

ROTATING AND WARPING PROJECTOR/BACKPROJECTOR FOR CONVERGING-BEAM GEOMETRIES

BACKGROUND OF THE INVENTION

The present invention relates to the art of diagnostic imaging. It finds application in conjunction with single-photon emission computed tomography (SPECT) with multi-headed cameras and will be described with particular reference thereto. It is to be appreciated, however, that the invention will also find application in other non-invasive investigation techniques such as positron emission tomography (PET) and other diagnostic modes in which a subject is examined for emitted radiation and with transmitted radiation.

Heretofore, single photon emission computed tomography has been used to study a radionuclide distribution in subjects. Typically, one or more radiopharmaceuticals are injected into a subject. The radiopharmaceuticals are commonly injected into the subject's blood stream for imaging the circulatory system or for imaging specific organs which absorb the injected radiopharmaceuticals. Gamma or scintillation camera heads are placed closely adjacent to a surface of the subject to monitor and record emitted radiation. In single photon-emission computed tomography, the head is rotated or indexed around the subject to monitor the emitted radiation from a plurality of directions. The monitored radiation data from the multiplicity of directions is reconstructed into a three dimensional image representation of the radiopharmaceutical distribution within the subject.

One of the problems with the SPECT imaging technique is that photon absorption and scatter by portions of the subject between the emitting radionuclide and the camera head distort the resultant image. One solution for compensating for photon attenuation is to assume uniform photon attenuation throughout the subject. That is, the subject is assumed to be completely homogenous in terms of radiation attenuation with no distinction made for bone, soft tissue, lung, etc. This enables attenuation estimates to be made based on the surface contour of the subject. Of course, human subjects do not cause uniform radiation attenuation, especially in the chest.

In order to obtain more accurate radiation attenuation measurements, a direct measurement is made using transmission computed tomography techniques. In this technique, radiation is projected from a radiation source through the subject. Radiation that is not attenuated is received by detectors at the opposite side. The source and detectors are rotated to collect transmission data concurrently with the emission data through a multiplicity of angles. This transmission data is reconstructed into an image representation using conventional tomography algorithms. The radiation attenuation properties of the subject from the transmission computed tomography image are used to correct for radiation attenuation in the SPECT or other emission data.

There are several known methods which correct distortions in single photon emission computed tomography (SPECT) images caused by spatially varying collimator geometric point response and scatter. These methods additionally correct for distortions caused by attenuation. The distortions are corrected by using an iterative reconstruction algorithm which requires one projection and one backprojection operation per iteration. The attenuation, geometric response, and scatter are modeled in the projector/backprojector. A problem with these known methods is that the three-dimensional implementation of collimator response and scatter is computationally very expensive.

For parallel geometry, the computational speed is improved by using a projector/backprojector pair that rotates the image volume for each projection angle. In this manner, the projection operation can be achieved by a simple weighted summation, and the backprojection operation can be achieved by copying weighted projection array values to the image volume.

The present invention contemplates a new and improved projector/backprojector for converging-beam geometries.

SUMMARY OF THE INVENTION

In accordance with one aspect of the present invention, a diagnostic imaging system is provided for reconstructing a volume image in an image memory from emission data projections collected at a plurality of projection angles by a radiation detector head having a convergent ray collimator. A projector projects an estimated volume image stored in the image memory along a selected projection direction to form a two-dimensional reprojection. The reprojector includes a warping means which transforms or warps the volume image such that rays which converge at a common angle with the convergent ray collimator become parallel. A projection combining means combines each reprojection from the projector with a collected emission data projection along a common projection direction to generate a two-dimensional data array. A backprojector backprojects the two-dimensional data array to form a volume of correction factors. The backprojector includes an unwarping means for transforming the backprojected arrays such that parallel rays converge at the common angle with the convergent ray collimator. A rotation processor rotates the unwarped volume of correction factors and the unwarped, rotated volume of correction values for all projection directions are summed. A volumetric image updating means multiplies the estimated volume image by the sum of the volume of correction factors.

In accordance with a more limited aspect of the present invention, the backprojector includes a duplicator which makes a plurality of copies of the two-dimensional array. A convolver convolves each of the copies with a point response function which is weighted in accordance with a depth with which each copy is to be backprojected. The warping means then transforms the convolved two dimensional arrays. A rotating means rotates the transformed and convolved two-dimensional arrays to a preselected reference direction forming the volume of correction factors.

In accordance with another more limited aspect of the present invention, the projector includes a rotating means for rotating the estimated volume image to a preselected projection direction. The warping means weights each rotated volume image. A convolver convolves each layer of the rotated and weighted volume image by a point response function which is weighted in accordance with the depth of each layer into the image volume. An integrator adds corresponding pixels in each layer to form the reprojection.

In accordance with a yet more limited aspect of the present invention, transmission radiation projections are collected and reconstructed into an attenuation map. The attenuation map is used to model the attenuation of the pixel values added by the projector integrator and the pixel values generated by the backprojector convolver.

One advantage of the present invention is that a faster projector/backprojector is achieved to reconstruct convergent beam projections which corrects for attenuation, scatter, and geometric point response distortions. A ray-driven projector/backprojector takes about two weeks to reconstruct converging-beam projections using 100 iterations of the EM-ML algorithm. For the same reconstruction problem, the present invention reduces the reconstruction time to a few hours running on eight IBM RS-6000-560 computers. When the rotating and warping is hardware rather than software implemented, the processing time will be reduced to a few minutes.

Another advantage of the present invention is that reconstruction for converging-beam geometries are executed as parallel beam geometries which are rotated such that the face of the imaging pixels is always parallel to the detector face.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 3A is a diagrammatic illustration of warping convergent rays and an unwarped image volume into parallel rays and a warped image volume;

FIG. 3B is a perspective view illustrating a fan-beam image volume after warping;

FIG. 3C is a perspective view illustrating a cone-beam image volume after warping; and, FIG. 4 illustrates a relationship between a layer in the image volume, the detector, and a focal point for a cone-beam collimator.

DETAILED DESCRIPTION OF THE PREFERRED EMBODIMENTS

Figure 1:
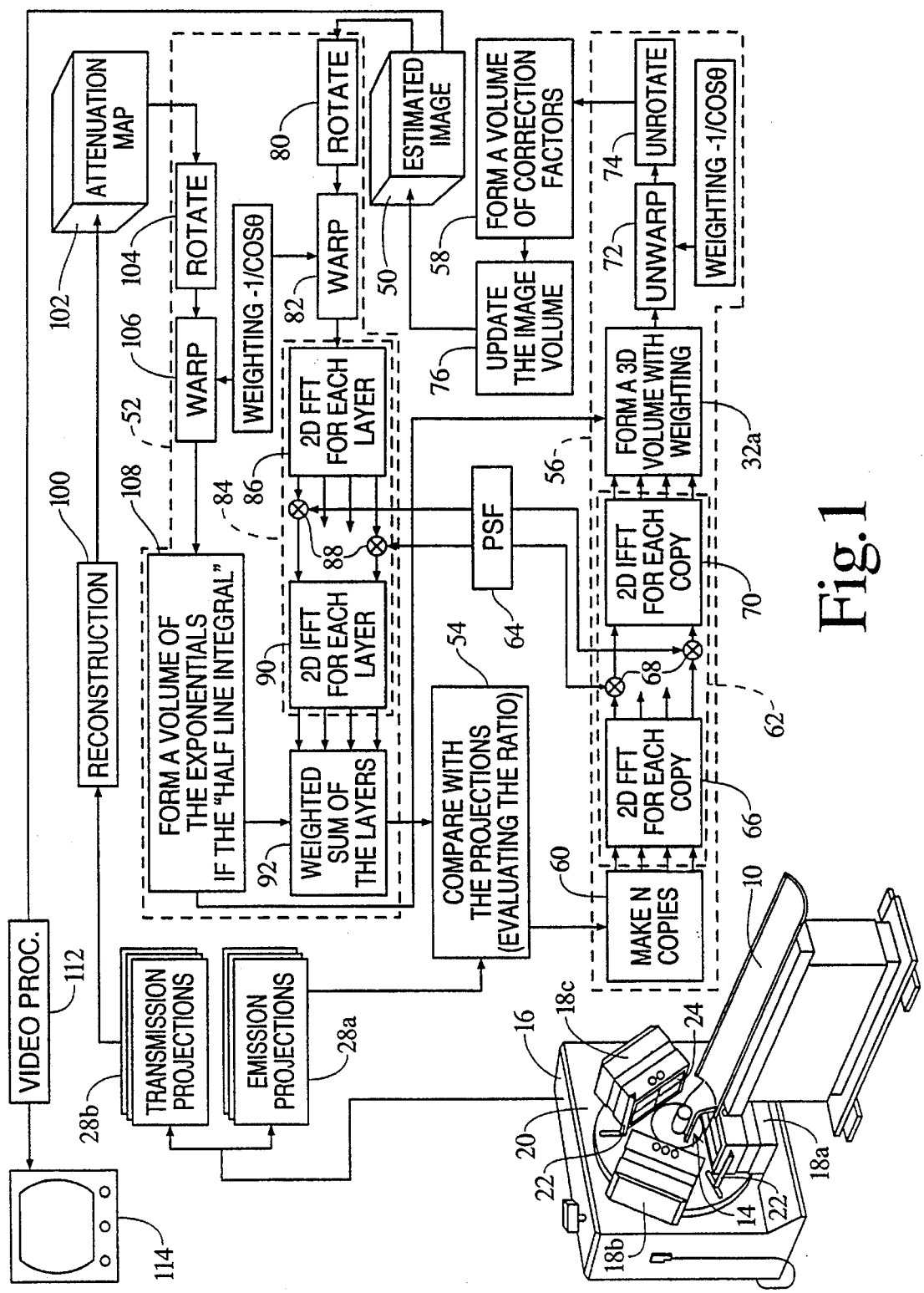
FIG. 1 is a perspective view of a gamma camera system in accordance with the present invention.

With reference to FIG. 1, a SPECT camera assembly includes a patient couch or support means 10 for holding a subject such as a phantom 12 or a human patient in an examination region 14. A gantry 16 supports a plurality of gamma detector heads 18a, 18b, and 18c at regular intervals around the examination region 14, e.g., 120°. More specifically, a rotating device including a rotating drum or face plate 20 to which the detector heads are mounted and a drive motor selectively rotate the detector heads around the examination region. A controller is provided for rotating the detector heads around the subject and moving the detector heads toward and away from the subject during the rotation, as is conventional in the art.

A radiation source 22, a line source in the FIG. 1 embodiment, is mounted directly opposite a first of the gamma detector heads 18a and between the other two gamma detector heads 18b, 18c. The radiation source is selectively positionable radially either closer to or further from the first detector head 18a. Preferably, the radiation source 22 is disposed behind a plane of the face of the detector heads 18b and 18c such that radiation therefrom cannot impinge directly on the other detector heads 18b, 18c. Optionally, one or more additional radiation sources 22' may also be provided. The transmission radiation source may be a tube or vessel filled with a radionuclide or an active radiation generator such as an x-ray tube.

As is conventional in the art, each detector head has a scintillation crystal that responds to incident radiation by producing a flash of light. An array of photomultiplier tubes produce electrical signals in response to each flash of light. The signals responsive to the same scintillation or flash of light are combined. The magnitude of the resultant sum is indicative of the energy of the incident radiation and the relative response of the closest photo-multiplier tubes is indicative of the spatial location of the scintillation.

With continuing reference to FIG. 1, during a scan, emission and transmission radiation are collimated by convergent beam collimator 24, such as a fan-beam collimator or a cone beam collimator, and collected by the detector heads. A projection image plane is collected indicative of the received emission radiation at each angular position. The collected data plane is stored in an emission data memory 28a. An attenuation projection plane is collected concurrently indicative of the received transmission radiation and is stored in a transmission data memory 28b. It is to be appreciated that transmission radiation is not required.

Figure 2A:
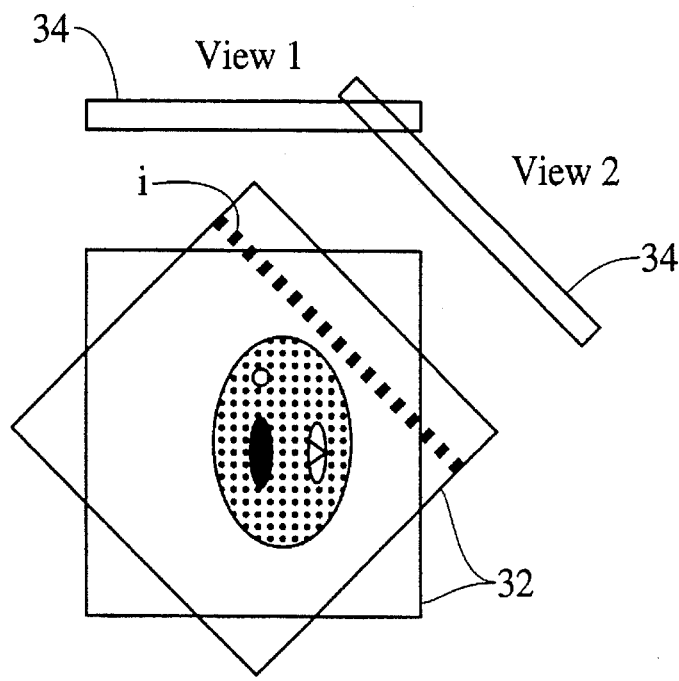
FIG. 2A is a top view of an image volume rotated to be parallel with the detector.
Figure 2B:
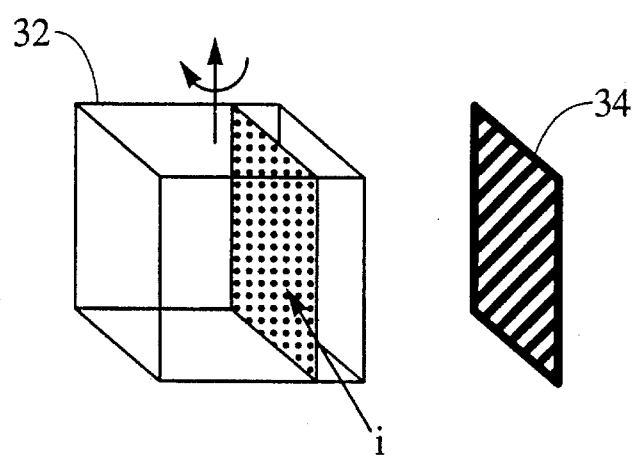
FIG. 2B is a perspective view of the image volume rotated to be parallel with the detector.

With reference to FIGS. 1, 2A, and 2B, a rotator 30 rotates a voxelized image volume 32 serially to each projection angle. At each detector head data collection position, a front face of the voxelized image volume 32 is rotated to be parallel to a detector or projection plane 34 of one of the detector heads, e.g., head 22 as viewed along an axis of rotation. The front face is a side which is nearest the detection plane 34. After rotating, each voxel of a layer i is the same distance from the detection plane 34. A layer is a one voxel wide slice in the image volume which is parallel to the detection plane.

With reference to FIG. 3A, a warping/unwarping processor transforms or unwarps the image volume 32 such that the diverging rays 36 become parallel rays 38 inside the warped image volume 32a. During projection, the image volume is transformed such that parallel rays 38 converge at the same convergence angle as the fan or cone-beam collimator. For an image volume collected through a fan-beam collimator, warping is performed horizontally as shown in FIG. 3B. For an image volume collected through a cone-beam collimator, warping is performed in both horizontal and vertical directions as shown in FIG. 3C.

Figure 4:
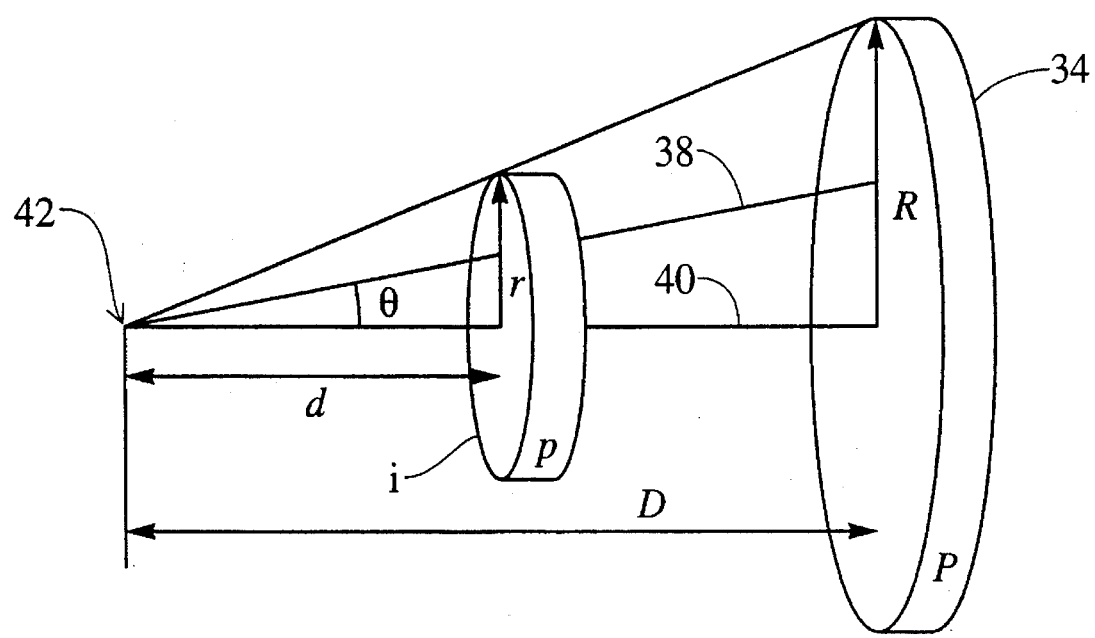

With reference to FIGS. 3A and 4, when the image volume 32 of diverging rays 36 is warped into a pseudo-parallel-beam volume 32a, a weighting factor of $1/\cos\theta$ is introduced for each diverging ray 36. The angle $\theta$ is the angle between the original ray 36 and the pseudo-parallel ray 38. After warping, a line integral for the pseudo-parallel ray 38 is the same as the original line integral with the diverging ray Interpolations between the voxels are performed for botch rotating and warping steps. Alternatively, these two interpolations steps are combined in hardware processors which perform a single interpolation.

With reference again to FIG. 1, a resultant volume image is initially estimated and stored in an estimated or volume image memory 50. Planes of projection data are collected at each of a plurality of data collection directions. A projector 52 projects the estimated volume image along each direction at which data is collected to generate a corresponding reprojection. In the preferred embodiment, the estimated volume image is initially a uniform image with each data value being a 1. A ratio means 54 takes the ratio of each collected projection image and the reprojected image for the corresponding projection direction. In this manner, for each angle, a two-dimensional array of ratios is generated. A backprojector 56 backprojects the two-dimensional arrays of ratios into a volume correction factor memory 58. The correction factors are used to correct or reestimate the estimated volume image in memory Looking to the backprojector 56 in greater detail, a duplicator 60 duplicates each array of ratios n times, where n is the number of layers or planes in the warped image volume 32a. A convolver 62 convolves each of the n copies with a kernel function from a point response function memory 64 which is weighted with a layer depth in accordance with the inverse cosine weighting discussed above. The kernel function is a geometric point response function, a scatter correction function, or a combination of the two. More specifically, a two-dimensional fast Fourier transform algorithm 66 transforms each of the n ratio arrays into Fourier space. Multipliers 68 multiply each of the n copies by a point response/scatter correction function weighted in accordance with depth in the warped image volume 32a into which each of the n copies is being backprojected. An inverse two-dimensional fast Fourier transform algorithm 70 transforms the convolved ratio arrays from Fourier space back to image space. Each of the n convolved copies is loaded into the corresponding layer of the image volume 32a. When transmission data is collected, the volume data is modeled in accordance with an attenuation map as discussed below.

An unwarping processor 72 applies an unwrapping algorithm which transforms the parallel rays along which the ratio arrays were backprojected into convergent rays which converge with the same angle as the detector head collimator. The unwarping processor weights each backprojected layer of the warped image volume data with the 1/cosθ weighting function discussed above. An unrotating algorithm 74 rotates the unwarped volume to a preselected orientation or direction. The unwarped and rotated three-dimensional volumes of correction factors for all of the projection directions are scanned in the correction factor memory 58. An estimated volume image updating means or algorithm 76 updates the image in the volume image memory 50 in accordance with the correction factor sums. Again, the backprojection process started with a ratio. The updating means or algorithm 76 multiplies each voxel value of the estimated volume image 50 by the corresponding correction factor. By iteratively repeating the correction of the estimated image, forward projection of the corrected estimated image, ratioing the projections of the corrected image with the collected data projections, backprojecting the ratios, and further correcting the estimated image, the volume image 50 progressively becomes more accurate.

The projector 52 includes a rotation processor or algorithm 80 which rotates the estimated volume image representation in the volume image memory 50 to a selected projection direction. A warping processor or algorithm 82 warps or transforms the three-dimensional volume such that convergent rays in the estimated three-dimensional image 50 become parallel. Each layer of the warped volume image is again weighted with the corresponding 1/cosθ weighting function. A convolver 84 convolves the warped and rotated image representation with the point response/scatter correction function 64. Again, the point response/scatter correction function for each layer is weighted in accordance with its depth from the front face of the volume in the projection direction. In the preferred embodiment, the convolver 84 operates in Fourier space. A two-dimensional Fourier transform processor or algorithm 86 converts the volume image into Fourier space. A series of multipliers 88 multiply each layer of data in the volume image by a correspondingly weighted point response/scatter correction function from the point response/scatter correction function memory 64. An inverse two-dimensional Fourier transform processor or algorithm 90 converts the volume image representation from Fourier space back to real space.

An integrator or summing means 92 adds corresponding pixels of each of the layers of data from the convolver 84. The weighted sum of the layers forms a projection or reprojection of the estimated volume image representation in the volume image memory 50 along the selected direction, in particular, the direction of the emission projection data to be processed. The ratio means or algorithm 54 again forms the ratio of the collected emission radiation projection and the reprojected projection. The ratio is backprojected 56. The backprojected volumes of correction factors are summed and used to correct the estimated volumetric image in the volumetric image in the volumetric image memory 50. The corrected estimated volume image is again projected and the resultant reprojections are again ratioed with the corresponding emission data projections and the process is repeated. In each successive iterative repetition, the stored estimated volumetric image comes to approach the resultant volumetric image more closely.

The emission data contains errors attributable to non-uniform attenuation of the emission radiation as it passes through the subject. To correct for the uneven attenuation, the series of transmission radiation projections from memory 28b are reconstructed 100 into a three-dimensional transmission radiation image or attenuation map which is stored in an attenuation map memory 102. Data from the volumetric attenuation map 102 is rotated 104 by the same amount as the reprojection of the estimated volumetric image. The attenuation map is warped by a warping algorithm or processor 106 and weighted in accordance with 1/cosθ analogous to the warping processor or algorithm 82. An algorithm or processor 108 forms a volume of exponentials of half line integrals indicative of attenuation along the rays, i.e., attenuation factors. The volume of line integrals models the layers of data summed by the integrator 92 and the volume data stored in memory 32a for attenuation in accordance with the line integrals.

A video processor 112 selectively withdraws data from the image memory 50 and formats the data to generate slices surface renderings, projections, and other images as are conventional in the art on a video monitor 114.

In one embodiment, an iterative emission EM-ML algorithm is used for image reconstruction. The algorithm is:

$$X_i^{new} = \frac{X_i^{old}}{\sum_l F_{il}} \sum_j \frac{F_{ij} P_j}{\sum_k F_{kj} X_k^{old}}, \quad (1)$$

where $X_i$ is the i-th voxel in the image volume, $P_j$ is the j-th projection bin, and $F_{ij}$ is the contribution of the i-th voxel $X_i$ to the j-th projection bin $P_j$. In Equation (1), the summation over k is the projection operation and the summations over j and l are the backprojection operations. The summation over l is a backprojector which backprojects a constant one.

It is to be appreciated that other image reconstruction algorithms may be used, for example arithmetic ART image reconstruction and conjugate gradient reconstructions, as known to those of ordinary skill in the art.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A diagnostic imaging system for reconstructing a volume image in an image memory from emission data projections collected at a plurality of projection angles by a radiation detector head having a cone beam convergent ray collimator, the diagnostic imaging system comprising:

a projector for projecting the volume image stored in the image memory along a selected projection direction to form a two-dimensional reprojection along the selected projection direction, the projector including a warping means for transforming the volume image in two dimensions such that rays which converge at a common angle with the cone beam convergent ray collimator become parallel;

a projection combining means for combining each two-dimensional reprojection from the projector with a collected emission data projection in a common projection direction to generate a two-dimensional data array;

a backprojector for backprojecting the two-dimensional data array to form a volume of correction factors, the backprojector including:

an unwarping means for transforming the backprojected data arrays such that parallel rays converge in two dimensions at the common angle with the cone beam convergent ray collimator, a processor for weighting the data arrays with a weighting function to generate an unwarped volume, and an unrotating means Which rotates the unwarped volume to a preselected orientation to form the volume of correction factors; and a volumetric image updating means for correcting the volume image in the image memory in accordance with the volume of correction factors.

2. The diagnostic imaging system as set forth in claim 1 wherein the backprojector unwarping means and the projector warping means each include a weighting means for weighting the transformed volumetric data in accordance with a corresponding convergence angle.

3. The diagnostic imaging system as set forth in claim 1 further including:

a transmission radiation source disposed across a subject from the detector head such that the detector head collects transmission radiation projections from the transmission radiation source that has traversed the subject and wherein the subject is injected with a radioisotope which gives off emission radiation such that the detector head collects emission radiation projections;

a reconstruction means for reconstructing the transmission radiation projections collected by the detector head into a three-dimensional volumetric attenuation map;

a rotation processor for rotating the attenuation map in accordance with a selected projection direction;

a warping processor for transforming the rotated attenuation map such that rays which converge at the common angle with the convergent ray collimator become parallel;

a means for modeling attenuation along each projection ray, the means for modeling attenuation being connected with the projector for modeling each reprojection for attenuation and with the backprojector for modeling each backprojected volume for attenuation.

4. A diagnostic imaging system for reconstructing a volume image in an image memory from emission data projections collected at a plurality of projection angles by a radiation detector head having a convergent ray collimator, the diagnostic imaging system comprising:

a protector for projecting the volume image stored in the image memory along a selected projection direction to form a two-dimensional reprojection along the selected projection direction, the projector including a warping means for transforming the volume image such that rays which converge at a common angle with the convergent ray collimator become parallel;

a projection combining means for combining each two-dimensional reprojection from the projector with a collected emission data projection in a common projection direction to generate a two-dimensional data array;

a backprojector for backprojecting the two-dimensional data array to form a volume of correction factors, the backprojector including an unwarping means for transforming the backprojected data arrays such that parallel rays converge at the common angle with the convergent ray collimator;

a volumetric image updating means for correcting the volume image in the image memory in accordance with the volume of correction factors;

a memory for storing a series of functions for correcting for at least one of geometric point response and scatter functions which are scaled in accordance with a depth of each layer in the volume image;

the backprojector and projector each including a convolver for convolving data with a corresponding function.

5. The diagnostic imaging system as set forth in claim 4 wherein the backprojector includes a rotation processor for rotating unwarped volumes to a reference orientation and the projector includes a rotation processor for rotating the volume image into alignment with selected projection directions.

6. A diagnostic imaging system for reconstructing a volume image in an image memory from emission data projections collected at a plurality of projection angles by a radiation detector head having a convergent ray collimator, the diagnostic imaging system comprising:

a rotation processor for rotating the volume image from the volume image memory to a preselected projection direction;

a projector for projecting the volume image stored in the image memory along the preselected projection direction to form a two-dimensional reprojection along the preselected projection direction, the projector including a warping means for transforming the volume image such that rays which converge at a common angle with the convergent ray collimator become parallel;

a convolver for convolving each layer of the volume image after transformation by the warping means by at least one of a point response function and a scatter correction function, the function being weighted in accordance with the depth of each layer into the volume image;

an integrator for adding corresponding pixels in each layer to form the two-dimensional reprojection;

a projection combining means for combining each two-dimensional reprojection from the projector with a collected emission data projection in a common projection direction to generate a two-dimensional data array;

a backprojector for backprojecting the two-dimensional data array to form a volume of correction factors, the backprojector including an unwarping means for transforming the backprojected data arrays such that parallel rays converge at the common angle with the convergent ray collimator; and, a volumetric image updating means for correcting the volume image in the image memory in accordance with the volume of correction factors.

7. A diagnostic imaging system for reconstructing a volume image in an image memory from emission data projections collected at a plurality of projection angles by a radiation detector head having a convergent ray collimator, the diagnostic imaging system comprising:

a projector for projecting the volume image stored in the image memory along a selected projection direction to form a two-dimensional reprojection along the selected projection direction, the projector including a warping means for transforming the volume image such that rays Which converge at a common angle With the convergent ray collimator become parallel;

a projection combining means for combining each two-dimensional reprojection from the projector with a collected emission data projection in a common projection direction to generate a two-dimensional data array;

a backprojector for backprojecting the two-dimensional data array to form a volume of correction factors, the backprojector including:

a duplicator for making a plurality of copies of the two-dimensional array from the projection combining means;

a convolver for convolving each of the copies with at least one of a point response function and a scatter correction function, the function being weighted in accordance with a depth with which each copy is to be backprojected;

an unwarping means for weighting the transformed convolved two-dimensional arrays; and, a rotation processor for rotating the transformed, convolved two-dimensional arrays to a preselected direction, forming the volume of correction factors.

8. In a diagnostic imaging system which includes an image memory for storing a volumetric image representation, a backprojector for backprojecting two-dimensional projection data into three-dimensional data, and a projector for projecting three-dimensional data along a preselected projection direction to generate two-dimensional reprojection data, the improvement comprising:

a projecting combining means for combining collected projection data with reprojection data from the backprojector along common projection directions to define a two-dimensional data array, the projection combining means being connected with the backprojector such that the backprojector backprojects the two-dimensional array into a three-dimensional array;

a means for applying at least one of a point response function and a scatter correction function to the three-dimensional array;

an unwarping means for transforming the convolved three-dimensional array such that rays which converge at a preselected angle become parallel;

a first rotating means for rotating the transformed three-dimensional array from the unwarping means to a preselected direction;

a means for updating the volumetric image representation in the image memory in accordance with a sum of the convolved, transformed, and rotates three-dimensional array from the first rotating means over a plurality of projection directions;

a second rotating means for rotating the volumetric image representation from the image memory;

a warping means for transforming the rotated volumetric image representation from the second rotating means such that rays which converge at the preselected angle are transformed to become parallel to each other, the warping means being connected with the projector such that the rotated and transformed volumetric image representation is projected to generate the reprojection data which is conveyed to the combining means.

9. A method of diagnostic imaging in which a volume image is reconstructed from emission data projections collected at a plurality of projection angles by a detector head having a convergent ray collimator having a preselected convergence angle, the diagnostic imaging method comprising:

rotating the volume image into alignment with a selected projection direction;

transforming the volume image such that rays which converge at the preselected convergence angle become parallel;

projecting the transformed volume image along the selected projection direction to form a two-dimensional reprojection;

combining the two-dimensional reprojection with a collected emission data projection along the selected projection direction to generate a two-dimensional data array including determining ratios of corresponding pixels of the reprojection and the collected emission data projection to create an array of ratios;

backprojecting the arrays of ratios to form a three-dimensional data array;

transforming the three-dimensional data array such that parallel rays are transformed to converge at the preselected convergence angle to generate a three-dimensional array of correction factors;

rotating the three-dimensional array of correction factors to a preselected direction;

summing the three-dimensional arrays of correction factors corresponding to a plurality of projection directions;

updating the volume image with the sum of the three-dimensional arrays of correction factors.

10. The method as set forth in claim 9 further including:

collecting transmission radiation projections;

reconstructing the transmission radiation projections into a three-dimensional attenuation map;

rotating the three-dimensional attenuation map in accordance with the selected projection direction;

transforming the rotated attenuation map such that rays which converge at the preselected convergence angle become parallel to generate a rotated and warped volumetric attenuation map;

during the projecting step, modeling pixels in each layer in accordance with the rotated and warped attenuation map to generate a transmission corrected reprojection for combining with the collected emission data projection;

during the backprojection step, modeling voxels of the three-dimensional array in accordance with the rotated and warped attenuation map.

11. The method as set forth in claim 9 wherein in the updating step, voxels of the volume image are multiplied by corresponding correction factors of the volume of correction factors.

12. The method as set forth in claim 9 further including weighting the transformed volume image and weighting the transformed three-dimensional array in accordance with the angle of convergence.

13. A method of diagnostic imaging in which volumetric data are reconstructed from emission data projections collected at a plurality of projection angles by a detector head having a convergent ray collimator having a preselected convergence angle, the diagnostic imaging method comprising:

rotating the volumetric data into alignment with a selected projection direction;

transforming the volumetric data such that rays which converge at the preselected convergence angle become parallel;

projecting the transformed volume image along the selected projection direction to form a two-dimensional reprojections for each of a plurality of layers in the volumetric data, including convolving the volumetric data with a function that is scaled in accordance with a depth of each layer of the volumetric data;

combining the two-dimensional reprojection with a collected emission data projection along the selected projection direction to generate a two-dimensional data array;

backprojecting the two-dimensional data array to form a three-dimensional data array including convolving the three-dimensional data array with a function that is scaled in accordance with a depth of each layer;

transforming the three-dimensional data array such that parallel rays are transformed to converge at the preselected convergence angle to generate a three-dimensional array of correction factors;

rotating the three-dimensional array of correction factors to a preselected direction;

summing the three-dimensional arrays of correction factors corresponding to a plurality of projection directions;

updating the volumetric data with the sum of the three-dimensional arrays Of correction factors.

14. The method as set forth in claim 13 wherein the function is one of a geometric point response function and a scatter correction function.

15. A method of diagnostic imaging in which a volume image is reconstructed from emission data projections collected at a plurality of projection angles by a detector head having a convergent ray collimator having a preselected convergence angle, the diagnostic imaging method comprising:

rotating the volume image into alignment with a selected projection direction;

transforming the volume image such that rays which converge at the preselected convergence angle become parallel;

projecting the transformed volume image along the selected projection direction to form two-dimensional reprojections;

combining each two-dimensional reprojection with collected emission data projection along the selected projection direction to generate a two-dimensional data array;

making a plurality of copies of the two-dimensional array;

convolving each copy of the two-dimensional array with a function which is weighted in accordance with a depth into a three-dimensional array to which each copy is to be backprojected;

backprojecting each convolved two-dimensional array to form the three-dimensional array;

transforming the three-dimensional data array such that parallel rays are transformed to converge at the preselected convergence angle to generate a three-dimensional array of correction factors;

rotating the three-dimensional array of correction factors to a preselected direction;

summing the three-dimensional arrays of correction factors corresponding to a plurality of projection directions;

updating the volume image with the sum of the three-dimensional arrays of correction factors.

16. A method of diagnostic imaging in which a volume image is reconstructed from emission data projections collected at a plurality of projection angles by a detector head having a convergent ray collimator having a preselected convergence angle, the diagnostic imaging method comprising:

rotating the volume image into alignment with a selected projection direction;

transforming the volume image such that rays which converge at the preselected convergence angle become parallel;

convolving each layer of the volume image after transformation with a function that is weighted in accordance with a depth of each layer into the volume image;

adding corresponding pixels in each convolved layer to form a two-dimensional reprojection;

combining the two-dimensional reprojection with a collected emission data projection along the selected projection direction to generate a two-dimensional data array;

backprojecting the two-dimensional data array to form a three-dimensional data array;

transforming the three-dimensional data array such that parallel rays are transformed to converge at the preselected convergence angle to generate a three-dimensional array of correction factors;

rotating the three-dimensional array of correction factors to a preselected direction;

summing the three-dimensional arrays of correction factors corresponding to a plurality of projection directions;

updating the volume image with the sum of the three-dimensional arrays of correction factors.

* * * * *